United States Patent [19]

Fowler

[11] Patent Number: 4,588,541

[45] Date of Patent: May 13, 1986

[54] FILLING OF INSULATING MATERIAL INTO BUILDING PANELS

[76] Inventor: James A. Fowler, 2892 Areca Dr., Los Alamitos, Calif. 90720

[21] Appl. No.: 671,180

[22] Filed: Nov. 14, 1984

[51] Int. Cl.⁴ .................... B29C 67/22; B29C 39/10; B29C 43/12

[52] U.S. Cl. .................. 264/45.2; 264/46.5; 264/261; 264/314; 425/127; 425/389; 425/817 R

[58] Field of Search .............. 264/45.2, 46.5, 261, 264/314; 425/127, 389, 817 R

[56] References Cited

U.S. PATENT DOCUMENTS

| | | |
|---|---|---|
| 2,852,807 | 9/1958 | Altschuler .................. 264/314 X |
| 3,410,931 | 11/1968 | Johnson ..................... 264/45.2 X |
| 3,455,074 | 7/1969 | Rice ......................... 264/42 X |
| 3,625,724 | 12/1971 | Alvero ....................... 264/42 X |
| 3,809,739 | 5/1974 | Gelin ........................ 425/389 X |
| 3,827,869 | 8/1974 | von Bonin ................... 264/42 X |
| 3,878,278 | 4/1975 | Miller et al. ................ 264/42 X |
| 4,017,572 | 4/1977 | Magone et al. ............... 264/314 X |
| 4,083,324 | 4/1978 | Krumweide ................... 264/42 X |
| 4,149,840 | 4/1979 | Tippmann .................... 425/389 X |
| 4,263,365 | 4/1981 | Burgess et al. .............. 264/42 X |
| 4,323,218 | 4/1982 | Plum ......................... 264/314 X |
| 4,330,589 | 5/1982 | Saito et al. ................ 264/42 X |
| 4,347,325 | 8/1982 | Michel et al. ............... 264/42 X |
| 4,422,989 | 12/1983 | Hums et al. ................. 264/42 |
| 4,447,201 | 5/1984 | Knudsen ..................... 425/389 X |
| 4,504,555 | 3/1985 | Prior et al. ................ 264/42 X |
| 4,518,550 | 5/1985 | Miettinen et al. ............ 425/817 R X |
| 4,522,578 | 6/1985 | Martin, Jr. et al. .......... 425/817 R X |

Primary Examiner—Philip Anderson
Attorney, Agent, or Firm—William P. Green

[57] ABSTRACT

Apparatus and methods for filling foamable insulating material into a cavity or cavities within the interior of a hollow building panel, by first positioning the panel within a chamber in a press, inflating a flexible bladder within the press at the outside of the panel, filling the foamable insulating material into the cavity or cavities in the panel, and restraining at least one wall of the panel by the force of said bladder against deflection by the foamable insulating material.

35 Claims, 15 Drawing Figures

FILLING OF INSULATING MATERIAL INTO BUILDING PANELS

BACKGROUND OF THE INVENTION

This invention relates to improved methods and apparatus for filling an insulating material into a cavity or cavities within the interior of a building panel.

The panels with which the invention is concerned are of a known type which may be pre-fabricated before delivery to a building site, and then assembled and secured together in side by side relation at the site so that a series of interconnected panels of this type can form together a wall or walls of a building. Each panel may include the studs in appropriate spacing for a particular part of the overall building wall structure, with both inside and outside skins or walls applied to the studs at their opposite sides and typically formed of plywood at the outer side of the building and sheet rock at its inner side. In some instances in the past, a foaming type resinous plastic insulating material has been injected into the cavities within the interior of panels of this type to produce a cellular mass occupying such cavities and containing a large number of air spaces acting to give the overall panel a very effective heat insulating characteristic. One difficulty which has been encountered in the past in producing such insulated building panels has resulted from the tendency for the side walls or skins of the panel and the intermediate studs and other components of the overall panel to distort or shift slightly under the forces which may be exerted by the insulating material as it is injected into the cavities within the interior of the panel and then cured therein.

SUMMARY OF THE INVENTION

A major purpose of the present invention is to provide improved methods and apparatus for producing insulated pre-fabricated building panels of the above discussed general type in a manner assuring against any substantial distortion or deflection of side walls or other components of the panel during their manufacture, and particularly during the insulating process. Further, this result is attained in equipment which is structurally very simple and constructed for effective and reliable operation in producing panels in quantity over long periods of time and at extremely low cost per panel. Additionally, the method by which walls are restrained against distortion by the insulating material is such as to render the equipment utilized in the process extremely versatile in operation, and capable of insulating panels of various different sizes in a single piece of equipment. The panels may contain door or window openings, electrical conduits, plumbing pipes, and the like to enable use of panels of this type at any location in the walls of a building structure.

Certain of these results are attained by utilization of a unique press in which a panel or panels are located while insulating material is injected into the interior of the panels, with that press employing an inflatable bladder as an element for applying restraining force to the outer side of one of the walls or skins of the panel. After the panel has been moved into a chamber in the press, the bladder may be inflated to exert force against a side of the panel, in a manner restraining that wall against deflection by internal forces within the panel and also pressing an opposite side of the panel against a wall of the chamber or another panel to prevent deformation of the panel at that side. Preferably, the inflatable bladder is located beneath a panel or panels, and functions upon inflation to raise the panel or panels slightly upwardly against a top wall of the chamber. The panels may be inserted into the chamber generally horizontally, and be supported movably during such insertion on a support structure, preferably taking the form of conveyor rollers along which the panels are easily moved to a proper position for injection of the insulating material. As the panels are ultimately raised slightly by inflation of the bladder, this upward movement of the panels also functions to raise them from their position of support by the roller or other support structure. At the peripheral edges of each panel, the studs and other boards or members extending between the two skins of the panel act to confine the insulating material within the inner cavities in the panel. These edge or peripheral walls of the panel may be restrained against displacement or distortion by fluid pressure actuated piston and cylinder mechanisms or the like.

BRIEF DESCRIPTION OF THE DRAWINGS

The above and other features and objects of the invention will be better understood from the following detailed description of the typical embodiment illustrated in the accompanying drawings in which.

DESCRIPTION OF THE PREFERRED EMBODIMENT

Figure 1:
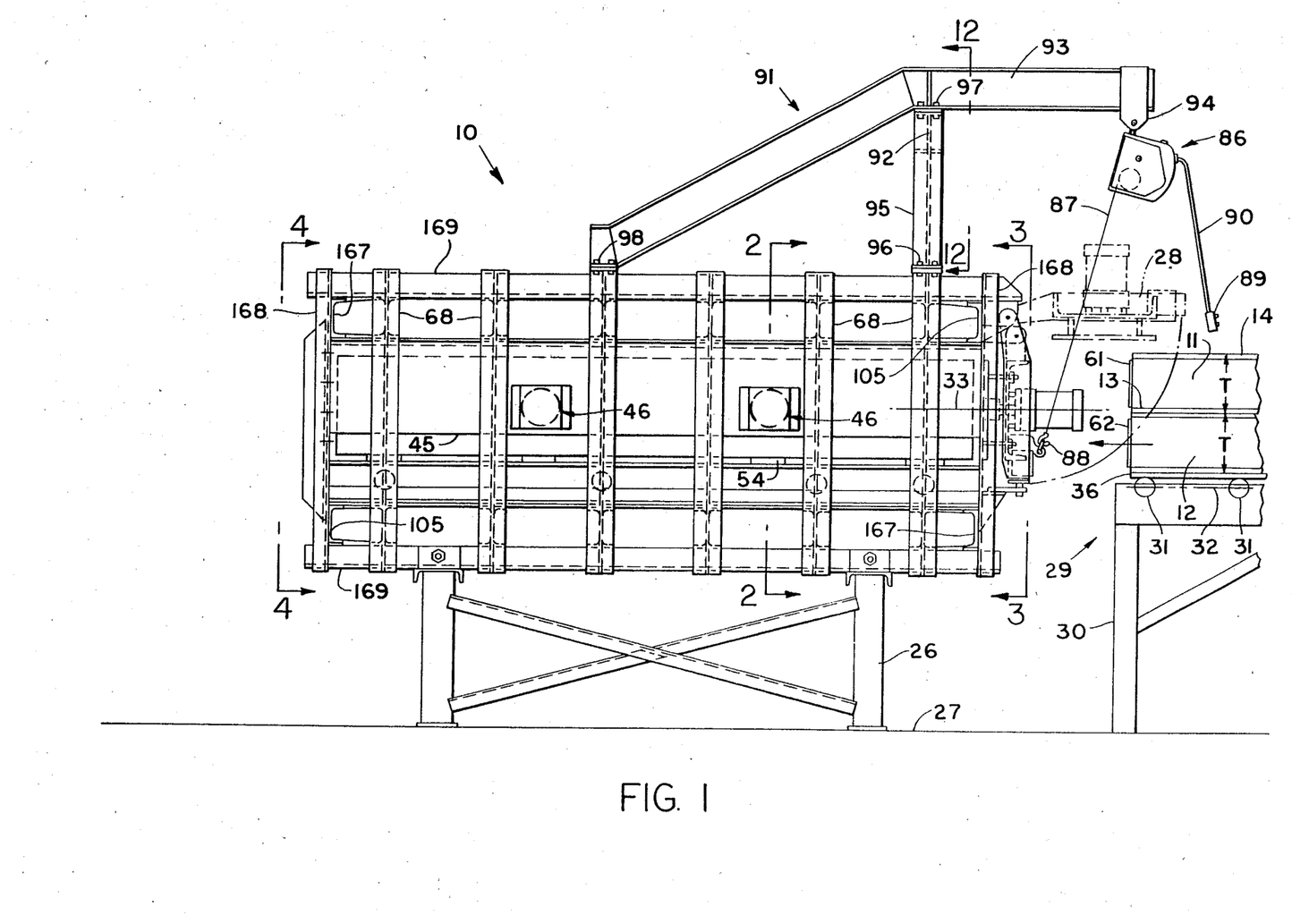
FIG. 1 is a side elevational view of a press embodying the present invention.
Figure 2:
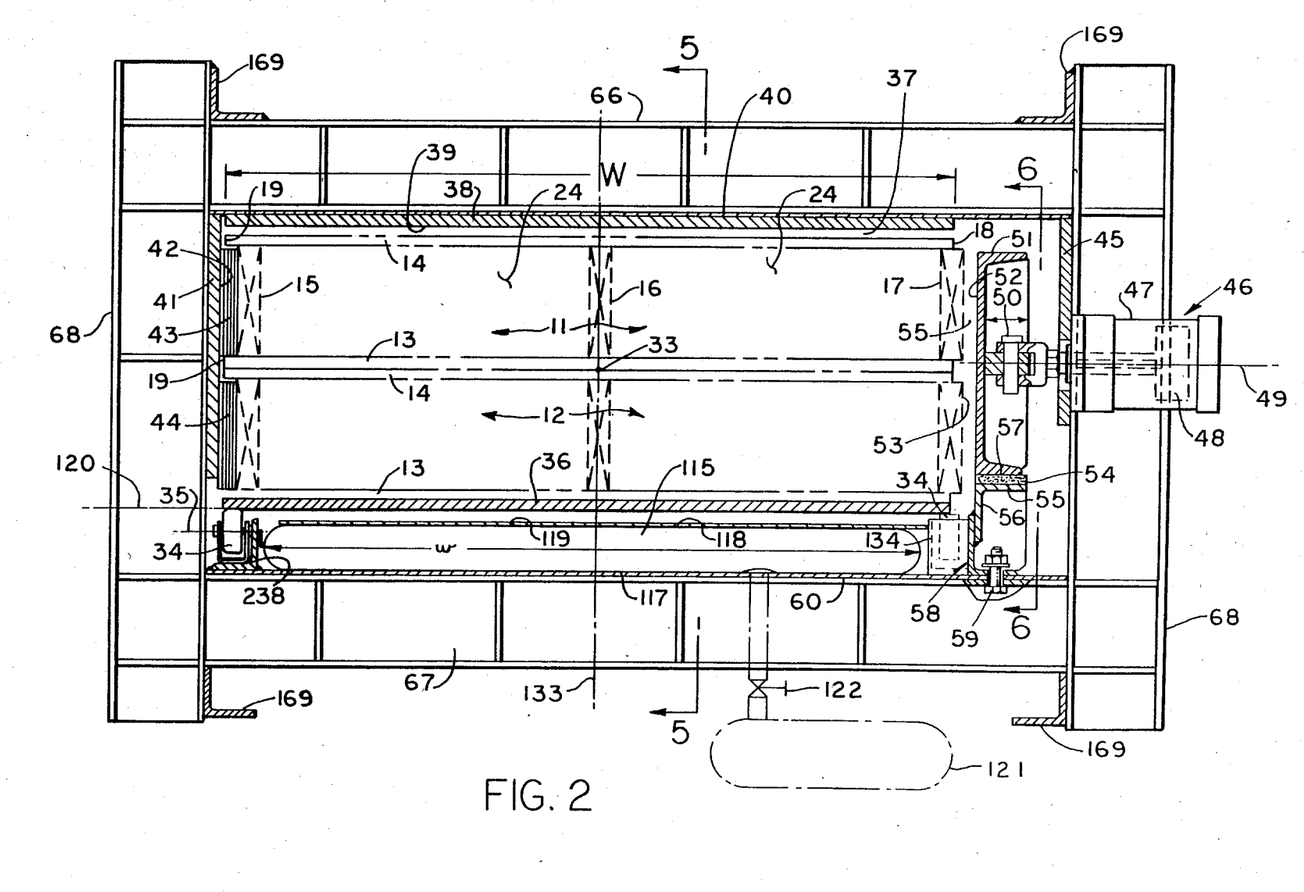
FIG. 2 is an enlarged transverse section taken on line 2—2 of FIG. 1.
Figure 5:
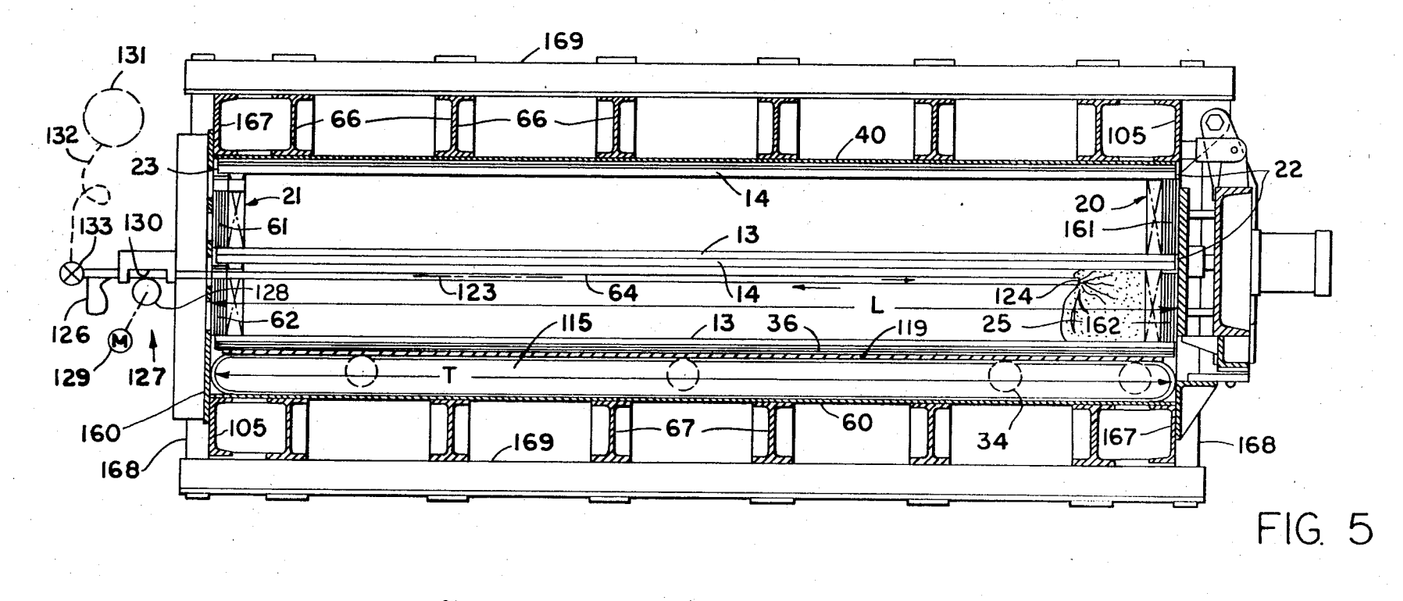
FIG. 5 is a reduced scale central vertical longitudinal section taken on line 5—5 of FIG. 2.
Figure 6:
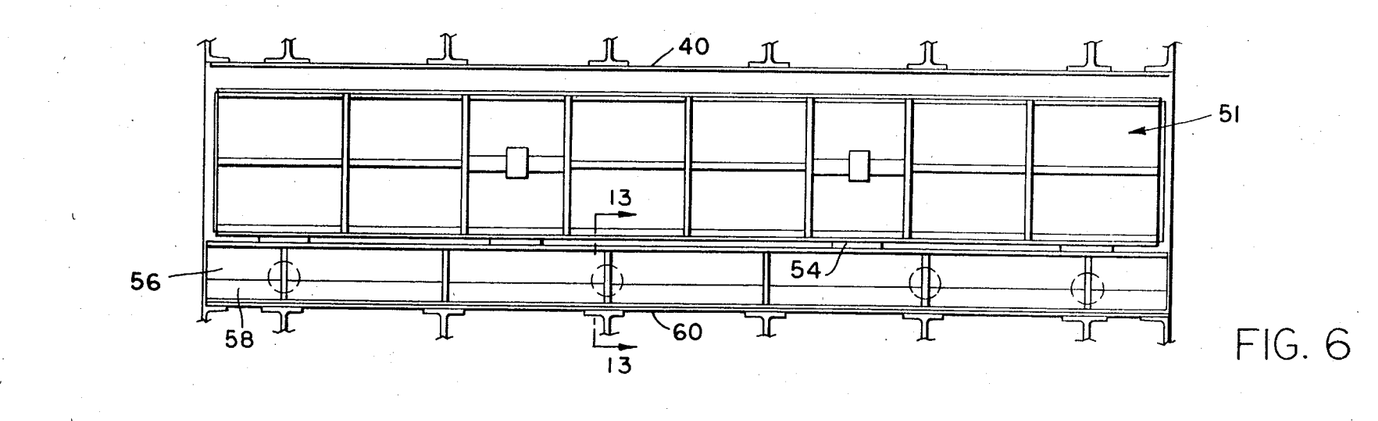
FIG. 6 is a reduced view taken on line 6—6 of FIG. 2.

Referring first to FIG. 1, there is illustrated at 10 in that figure a press to be utilized for injecting insulating material into wall panels 11 and 12 represented fragmentarily in FIG. 1 and shown in transverse and longitudinal sections in FIGS. 2 and 5 respectively. The press is capable of handling panels having any of various different vertical thickness dimensions T, but is typically illustrated in FIGS. 1, 2 and 5 as it appears when used for filling two superimposed panels each having a dimension T of eight inches. As stacked in the figures, each panel may have a bottom wall 13 typically formed of plywood and adapted to function as the exterior wall of a building, an upper wall 14 typically formed of plaster board adapted to function as the inner skin of the building wall structure. Between these outer and inner skins, each panel includes three elongated parallel vertical boards 15, 16 and 17 (FIG. 2), desirably of nonimal two inch by eight inch cross-section, to function as the studs of the ultimate wall structure and extend vertically within that structure between the usual lower mudsill elements and the top plate members. The outer and inner skins 13 and 14 of each panel may have a width dimension W (FIG. 2) of four feet, and have a length dimension L (FIG. 5) of eight feet, to thus be of standard 4'×8' size and standard eight inch thickness so that the ultimate wall structure formed by a series of these panels nailed together in interfitting relation will have all of the structural components necessary to satisfy conventional building codes. At the right side as viewed in FIG. 2, one of the studs 17 projects laterally a short distance beyond the side edges 18 of panels 13 and 14, while at the opposite side (left side in FIG. 2), the longtudinal edges 19 of the panels project slightly beyond stud 15, so that the projecting portion of stud 17 of one panel can extend into the recess formed between edges 19 of the other panel in interfitting relation with the panels being appropriately nailed or otherwise secured in that interfitting condition. At the opposite ends of the panel, two additional boards 20 and 21 of nominal two inch by eight inch cross section corresponding to the studs extend transversely across the stud ends and between the two skins 13 and 14, with edges 22 and 23 of the inner and outer skins 13 and 14 projecting slightly beyond members 20 and 21 as seen in FIG. 5 to provide recesses for receiving the mudsill and top plates of the wall structure. It will of course be understood that the skins 13 and 14 are nailed, secured adhesively, or otherwise attached rigidly to the intermediate studs 15, 16, and 17, and to boards 20 and 21. Thus, the panel contains voids or cavities 24 within the interior of the panel between the various members or boards forming the opposite sides and edges of the panel. The purpose of the press 10 is to fill an initially liquid foaming resinous plastic material 25 into these cavities, in a manner completely filling the cavities and hardening therein to a porous mass containing large numbers of minute air pockets giving the overall panel a highly heat insulative characteristic. The insulating substance utilized for this purpose may be polyurethane foam. If a particular panel is to be used at the location of a door, window or the like, the panel may contain an appropriately shaped opening or be given a desired irregular shape. Also, the panels may contain electrical conduits, piping, and other similar elements or fittings as necessary or desirable in the building to be constructed.

Figure 13:
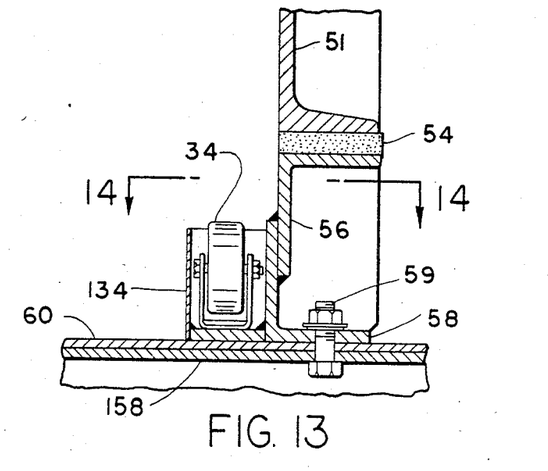
FIG. 13 is an enlarged fragmentary vertical section taken on line 13—13 of FIG. 6.

The press 10 is supported in horizontally extending condition by any convenient type of base typically represented at 26 resting on a floor surface 27. At one end, the press has a door 28 which is retained in the full line closed position of FIG. 1 during injection of insulating material into the panels, and which is openable to the broken line position of that figure to allow the panels 11 and 12 to be slid horizontally into and out of the press. During such movement into and out of the press, the two panels 11 and 12 may be supported movably on a horizontal conveyor structure 29, typically including a base 30 and a series of horizontally aligned rollers 31 mounted to the upper side of the base for rotation about parallel horizontal axes 32 which are aligned horizontally and disposed transversely of longitudinal axis 33 of the press along which the panels move in advancing into and out of the press. As will be apparent, enough of the rollers 31 are provided to the right of the two illustrated in FIG. 1 to support the panels completely and adequately in their FIG. 1 positions prior to movement into the press, and to effectively support the panels as they advance leftwardly from the FIG. 1 positions and into the press. Additional rollers 34 within the press (FIGS. 2, 5 and 13) support the panels as they advance into the press from conveyor 29. These rollers 34 turn about horizontal axes 35 which are disposed parallel to axes 32 of rollers 31 and are aligned horizontally therewith, to maintain the panels in directly horizontal condition during insertion into and removal from the press. While the panels are on conveyor 29 and within press 10, the panels are desirably supported on a flat board 36, which may be formed of plywood and have a width corresponding to the width W of the inner and outer skins of the panels and a length corresponding to the length L of the panel skins. This support board 36 engages and is supported by rollers 31 and 34, and in turn engages the underside of the lower panel 12, to support two panels 11 and 12 in superimposed relation. Also when filling panels less than four feet wide board 36 acts as a carrier to allow moving of narrow panels into and out of the press.

When the panels are fully inserted in the press, in the position of FIGS. 2 and 5, the panels are located within an inner chamber 37 of the press which is constructed to enable the panels to be effectively retained against any distortion of their skins, studs or other components by pressure exerted by the insulating foam. As seen in FIG. 2, this chamber 37 has a rigid horizontal top wall member 38 extending entirely across the top of the chamber and having a horizontal planar undersurface 39 engageable with the upper planar surface of the top wall 13 of the upper panel 11 over the entire four foot by eight foot area of that top wall to effectively maintain wall 14 in a precisely horizontal undeformed condition during the entire operation of the press. Since top wall 14 of the upper panel is in many instances formed of easily damaged sheet rock or plaster board, consisting of a layer of plaster covered by paper, the top wall 38 of the chamber may be formed of wood rather than metal, to have some slight capacity for limited deformation in a manner cushioning the contact with wall 14 and preventing damage thereto. This board 38 may be backed up and rendered rigid by a horizontal metal top wall 40 to which the panel contacting element 38 may be appropriately secured as by suitable metal fasteners.

The left side of the press chamber 37 as viewed in FIG. 2 may be formed by a vertical rigid preferably steel side plate or wall 41 having an inner surface 42 which extends directly vertically and parallel to the longitudinal axis 33 of the press and chamber 37. Filler pieces or boards 43 and 44 may be received adjacent surface 42 of side wall 41, and be dimensioned to project into the recesses between the edge portions 19 of the panel skins to contact only studs 15 and apply force only to those studs and not to the edges 19 of the sheets, thereby preventing damage to the sheets during operation of the press. The filler boards 43 and 44 may be elongated to extend along the entire length of each of the studs 15, and may have the cross section illustrated in FIG. 2 throughout the entire length of studs 15 and chamber 37. These boards 43 and 44 in the illustrated positions are preferably unattached to wall 41 and are manually placed in the positions illustrated in FIG. 2 upon each operation of the press.

At the right side of chamber 37 as viewed in FIG. 2, the rigid framework of the press may include a vertical rigid side wall 45, typically formed of a metal plate of substantial thickness to rigidly maintain its shape and position, with two piston and cylinder mechanisms 46 having their cylinders 47 rigidly connected to wall 45 at the horizontally spaced locations illustrated in FIG. 1. The pistons 48 of these mechanisms 46 are actuable pneumatically or by other fluid pressure along two parallel horizontal axes 49 which are perpendicular to a central vertical longitudinal plane 133 of the press and chamber 37, containing axis 33, and are perpendicular to vertical walls 41 and 45. The pistons 48 are connected in appropriate manner, as by pins 50, to a rigid pressure plate 51 which forms a movable side of chamber 37 extending parallel to the opposite side wall 41. Pressure plate 51 may be formed of metal to the configuration illustrated in the figures, and have an inner vertical surface 52 extending parallel to surface 42 of the opposite side wall 41 and parallel to axis 33 and plane 133 and adapted to bear against the vertical outer surfaces 53 of the two side studs 17 of panels 11 and 12 as viewed in FIG. 2. As will be apparent, surface 52 extends vertically through approximately the entire height of chamber 37, and it extends longitudinally for the full length of that chamber and the panels. By admission of air pressure to piston and cylinder mechanisms 46, their pistons 48 and pressure plate 51 can be actuated leftwardly as viewed in FIG. 2, toward the panels and into engagement with their studs 17, to press the panels leftwardly in a manner causing their opposite side studs 15 to bear against filler blocks 43 and 44 and press them tightly against side plate 41, thus effectively restraining studs 15 and 17 at both sides of the panels against deformation or displacement upon subjection to internal pressure within cavities 24. Pressure plate 51 may be supported for its limited inward and outward movement by a series of horizontal bearing plates or pads 54 (FIGS. 1 and 2), which rest on and may be fixedly attached to the upper horizontal surface of an enlongated horizontal flange 55 of an angle iron 56 extending longitudinally of the press, with the upper sides of elements 54 having horizontal surfaces engaged slidably by horizontal undersurfaces of pressure plate 51 at 57 to support the pressure plate while allowing its discussed inward and outward movement. Angle iron 56 may be welded to a second elongated angle iron 58 which in turn is welded to a series of horizontal elements 158 carrying rollers 34, with angle 58 being detachably secured by bolts 59 (FIG. 2) to a horizontal rigid base plate 60 desirably formed of steel, to allow the removal of elements 56, 58, 158 and 34 for servicing. The rollers 34 at the opposite side of the press are mounted to an angle iron 238 welded to plate 60, and are accessible for servicing.

At its inner end (left end as viewed in FIG. 5), chamber 37 has a vertical rigid end wall 160 disposed transversely of the longitudinal axis 33 of the press and chamber 37 and extending entirely across the ends of the panels to restrain movement or distortion of the panels leftwardly as viewed in FIG. 5 during the filling process. Two filler boards or blocks 61 and 62 similar to boards 43 and 44 are received at the inner side of end wall 160, and are dimensioned to project into the recesses between the end edges of the panels and thus engage end walls 21 of the panels to apply restraining force thereto without directly engaging or applying force to the edges of the skins 13 and 14 themselves. These filler boards 61 and 62 may extend across the entire width of the panels, and may be either secured to the panels or be loose and adapted to be placed in position within the ends of the panels manually prior to insertion of the panels into chamber 37. A series of openings 63 are formed in end wall 160 (see FIG. 4), at locations spaced across the entire horizontal and vertical extent of that end wall, to allow an injection probe 64 to be inserted longitudinally into the panels through these openings and through smaller openings 65 which have been drilled in filler blocks 61 and 62 and in end walls 21 during fabrication of the panels. Also small vent holes have been drilled in the same panel members and fillers at the location of holes 163 provided in end plate 160. These holes will permit air to escape from the panel voids during the foam filling operation. Openings 63 are large enough to allow an operator to move his hand through these openings into the interior of the press in order to manually reposition end fillers 61 and 62 in their proper locations of interfitting engagement with the ends of the panels, in the event that elements 61 and 62 have not remained in place during the moving of the panels into the press.

All of the rigid walls of chamber 37 thus far described may be reinforced and interconnected in rigidly fixed positions by any appropriate frame structure. In the form of the invention illustrated in the drawings, this reinforcing structure includes a number of parallel horizontal I-beams 66 extending across the upper side of the chamber and welded or otherwise secured to top wall 40 of the chamber, a similar series of parallel horizontally extending I-beams 67 extending across the underside of bottom wall or base plate 60 and appropriately secured thereto, and two series of vertical parallel columns or posts 68 (FIG. 1) extending vertically at opposite sides of the press and attached at their upper and lower ends to the horizontal beams 66 and 67. At both ends of the press, the I-beam structures have been replaced by channel structures 105, 167 and 168, for ease in mounting the door 28 at one end and the closure plate 160 at the other end. With the aid of four longitudinal angles 169, the above mentioned preassembled and welded rectangular beam and column frames are then accurately located on these angles and welded together securely, prior to the placement and welding of deck plates 40 and 60, and side plates 41 and 45. All of these elements welded together form a rigid strong box-like structure (see FIG. 2), within which the panels can be restrained against deformation or displacement of their parts upon injection of insulating material under pressure into the cavities in the panels.

Figure 7:
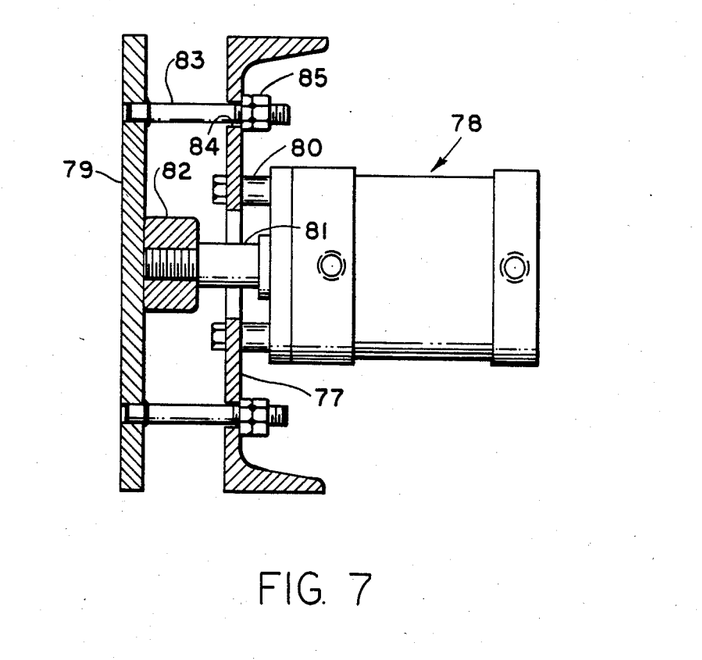
FIGS. 7, 8 and 9 are enlarged fragmentary vertical sectional detail views taken on lines 7—7, 8—8 and 9—9, respectively, of FIG. 3.

The door 28 at the forward end of chamber 37 is mounted by two hinges 69 for swinging movement about a horizontal axis 170 between the full line and broken line positions of FIG. 1. Each of these hinges may include a horizontal bolt or hinge pin 70 extending through registering openings in an upwardly projecting mounting arm 71 of the door and bracket plate 72 attached rigidly to the framework 105 and 168 of the press, with a bushing 73 being disposed about the bolt within the opening 74 in arm 71, to maintain the head 75 of the bolt slightly out of engagement with arm 71 in a manner allowing free rotation of that arm even when the nut 76 of the bolt is in fully tightened condition. The two arms 71 at opposite ends of the door may be appropriately rigidly welded to a main plate 77 of the door which extends essentially vertically in the closed position of the door, and which carries two piston and cylinder mechanisms 78 preferably pneumatically actuated to press a parallel vertical plate 79 tightly inwardly against the ends of the panels. The cylinder of each mechanism 78 is attached rigidly to plate 77 at 80, and its piston actuates a rod 81 carrying an enlargement 82 which bears against plate 79 to urge it inwardly. Four bolts 83 are attached rigidly to plate 79 and project through openings 84 in plate 77, carrying lock nuts 85 at the outer side of plate 77, in a relation allowing plate 79 to move in a left to right direction relative to the main plate 77 of the door as viewed in FIG. 7 in order to apply pressure to the ends of the panels. The freedom for motion of plate 79 relative to plate 77 is great enough to assure application of full longitudinal restraining force against the panels in the actuated condition of the piston and cylinder mechanisms 78, to thus effectively confine the panels longitudinally and restrain them against longitudinal distortion.

The door 28 is swung between its opened and closed positions of FIG. 1 by a hoist 86, including a motor energized by electricity or other power to pull a line 87 connected at 88 to the door upwardly and thereby swing the door from its closed position to its opened position. This hoist may be controlled by a switch unit 89 carried at the end of a flexible electrical control cord 90, and actuable manually to conditions for pulling the door upwardly or allowing it to close by gravity, or maintaining the door in any desired setting.

Figure 12:
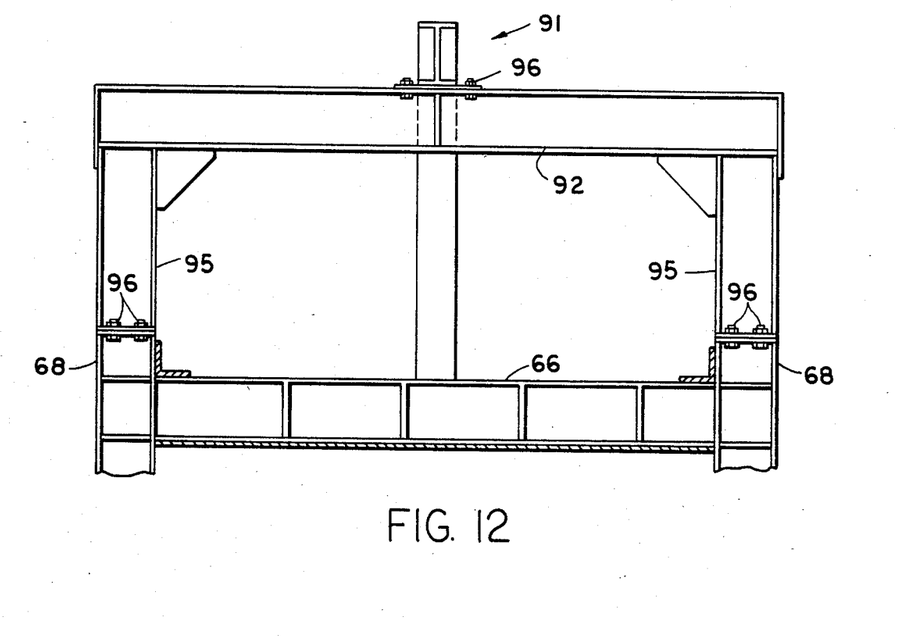
FIG. 12 is an enlarged fragmentary vertical transverse section taken on line 12—12 of FIG. 1.

Hoist 86 may be supported by a frame 91, appropriately attached to the top of the press structure. As seen in FIGS. 1 and 12, this structure 91 may include a transverse horizontal member 92 on which there is supported an arm 93 projecting to the right in FIG. 1 to carry a bracket 94 to which the hoist is detachably connectible. Member 92 may be supported from opposite sides of the framework of the press by two vertical columns 95 projecting upwardly from the upper ends of two of the columns 68, and rigidly but detachably connectible thereto by bolts 96. An inclined portion of arm 93 may extend downwardly and rearwardly from member 92 and be connected detachably to a central portion of member 92, by bolts 97, and at 98 to one of the rigid frame elements of the press, typically one of the upper transverse I-beams 66. By detachment of the bolts 96, 97 and 98, the entire hoist support assembly 91 and hoist can be removed from the remainder of the press for shipping.

Figure 3:
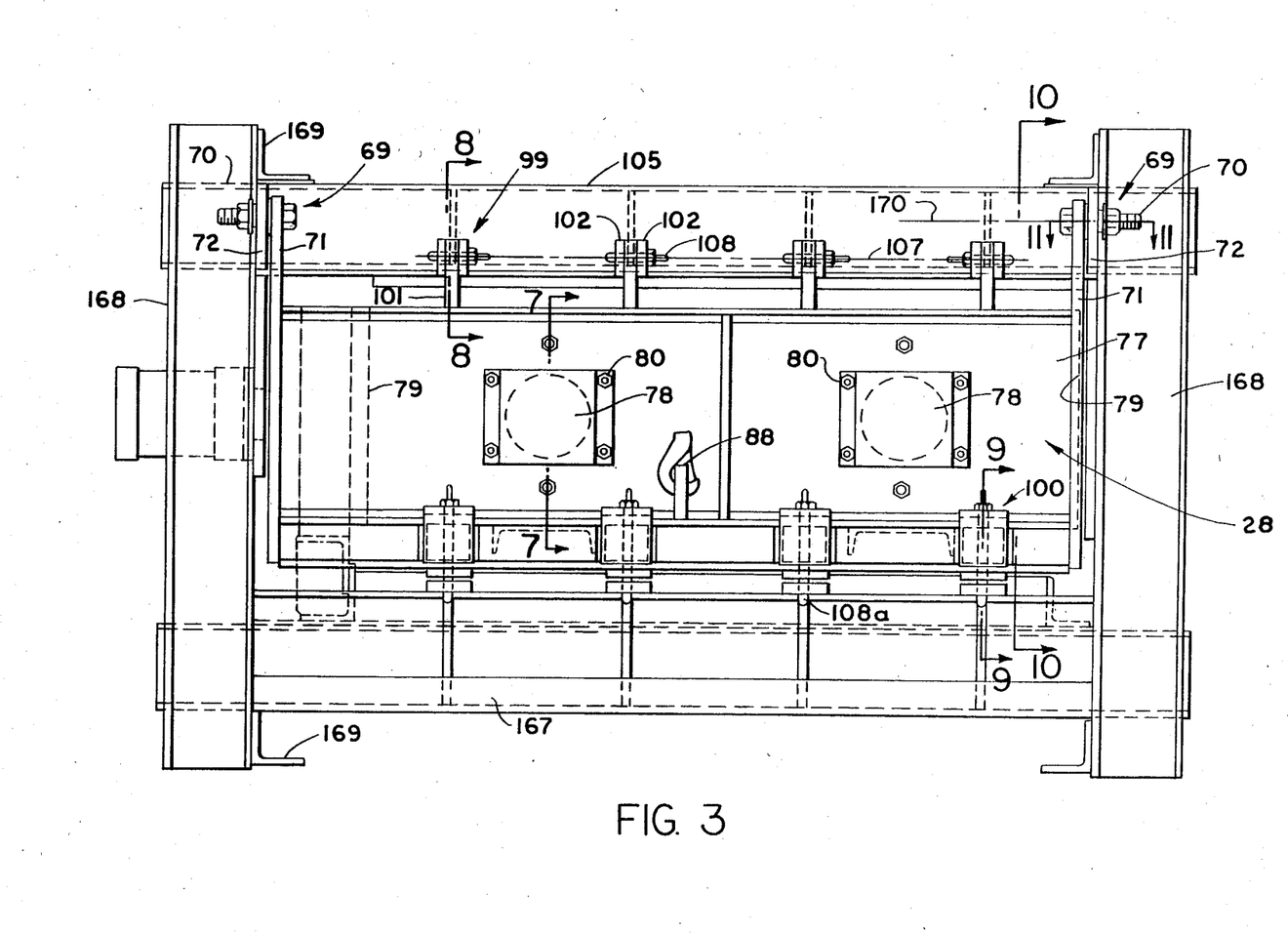
FIG. 3 is an enlarged front elevational view of the press taken on line 3—3 of FIG. 1.
Figure 8:
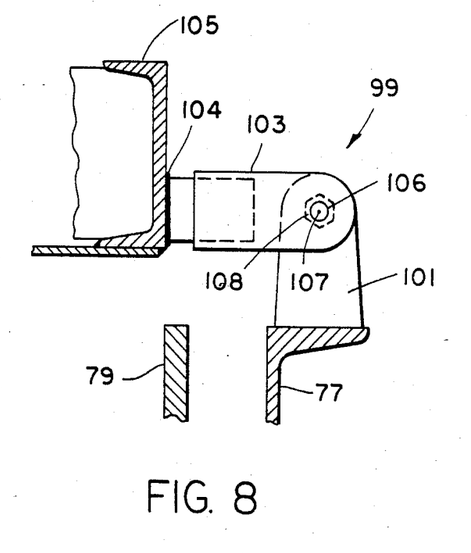
Figure 9:
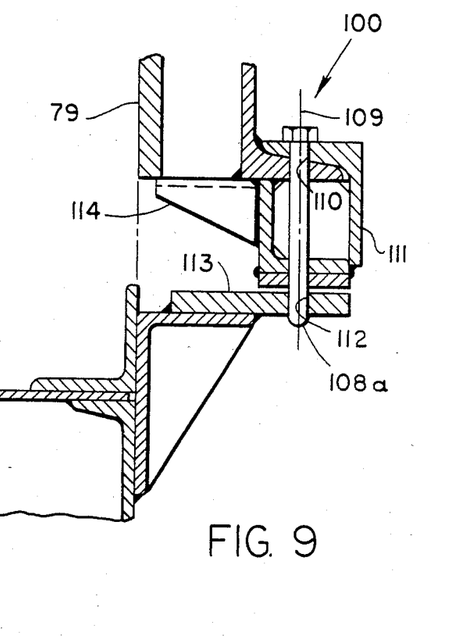
Figures 10, 11:
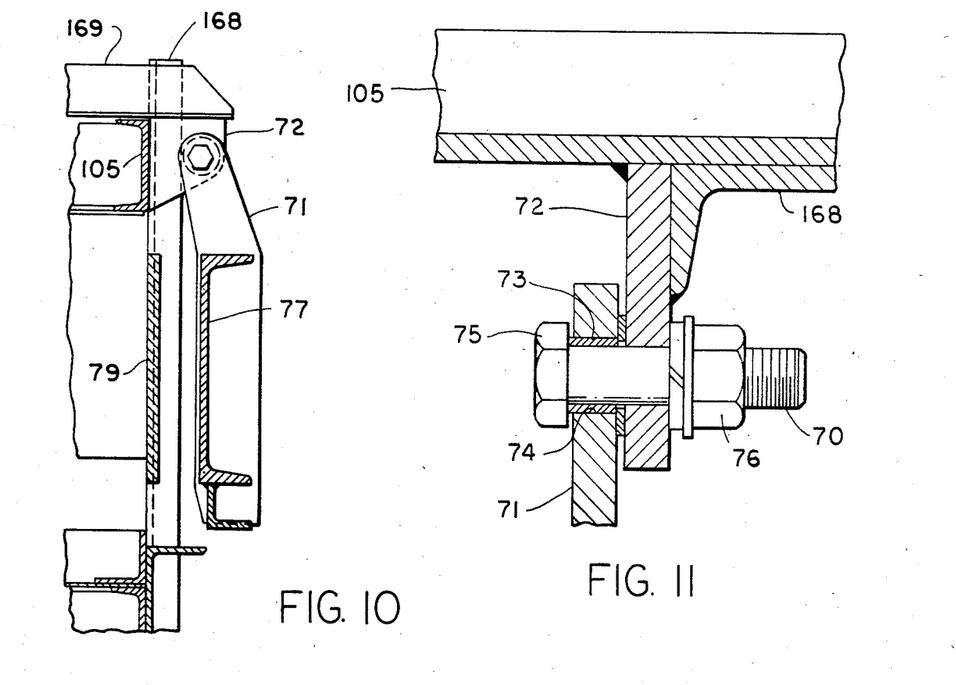
FIG. 10 is a fragmentary vertical section taken on line 10—10 of FIG. 3.
FIG. 11 is an enlarged fragmentary horizontal section taken on line 11—11 of FIG. 3.

The door 28 of the press is adapted to be rigidly retained in its vertically extending closed position by a series of upper lock assemblies 99 at the top of the door, as seen in FIG. 8, and a second series of lower lock assemblies 100 as illustrated in FIG. 9. Each of the upper assemblies 99 includes a rigid member 101 projecting upwardly from the upper edge of the door and receivable between the two arms 102 of a clevis 103 attached rigidly at 104 to one of the stationary frame elements 105 of the frame structure of the press. Element 101 and the two arms 102 of clevis 103 contain aligned apertures 106 centered about a horizontally extending axis 107 and within which a pin 108 is removably received to latch the parts in the FIG. 8 closed position of the door. As will be understood, the axes 107 of all of the pins 108 and the openings within which they are received are all aligned with one another horizontally as seen in FIG. 3.

The locking or latching assemblies 100 at the bottom of the door may include vertical pins 108a which are insertible downwardly along vertical axes 109 through openings 110 formed in a structure 111 carried by the bottom of the door and openings 112 in a horizontal plate 113 extending along the bottom of the doorway opening and welded or otherwise rigidly secured to the rigid framework of the press. The lower edge portion 111 of the door may be fabricated of a number of elongated elements having the cross section illustrated in FIG. 9 to give the bottom of the door an essentially square vertical cross section rendering the door extremely rigid for effectively resisting all forces encountered in use. Two elements 114 may project inwardly from this box like structure and be engageable with the lower edge of the previously mentioned slightly movable plate 79 to support that plate while allowing limited movement thereof.

At a location laterally between the two sets of rollers 34 which are provided at opposite sides of chamber 37 (FIG. 2), there is supported on the horizontal base plate 60 at the bottom of the chamber 37 an inflatable bladder 115, which extends horizontally and is generally rectangular in horizontal section. The width w of this bladder is slightly less than the width W of panels 11 and 12, as seen in FIG. 2, to support the panels across almost their entire width but not at the locations of rollers 34. The length T of bladder 115 is substantially equal to the length L of the panels, so that the bladder supports the panels over almost their entire horizontal extent. The bladder when deflated normally assumes the condition illustrated in FIGS. 2 and 5, having a bottom wall 117 which extends horizontally and engages the upper horizontal surface of base plate 60, and an upper wall 118 which extends horizontally and supports a horizontal rigid rectangular plate 119. During movement of the panels into chamber 37, the bladder supported plate 119 is spaced a short distance beneath the plane 120 of the upper edges of rollers 34 to thus avoid contact with the board 36 on which the panels rest as that board and the panels move into the press. When inflated, the bladder actuates the plate 119 upwardly toward the plane 120, to engage the underside of board 36 and then raise that board and the panels upwardly far enough to bring the top wall 14 of the upper panel into engagement with element 38 at the top of chamber 37, so that the bladder applies upward force to the panels, and board 38 at the top of the chamber applies downward force to the panels in a manner confining them against distortion while pressurized insulating material is filled in the voids in the panels. Bladder 115 is formed of rubber or other resiliently deformable material, which will automatically collapse to the FIG. 2 condition when deflated, with the collapse of the bladder being assured by the weight of the plate 119 supported thereon. Air is supplied to the bladder from any suitable source of compressed air such as that represented at 121 in FIG. 2, under the control of a manually actuated valve unit 122 acting to cause either inflation or deflation of the bladder as desired. At the location of each of the rollers 34 which are at the right side of the bladder as viewed in FIG. 2, there may be provided a stationary protective wall 134 (FIGS. 13 and 14) welded to elements 58 and 158 for removal therewith and projecting upwardly above bottom plate 60 to a level near the top of the roller and extending about the inner side of the roller in a configuration such as that illustrated in FIG. 14 to engage the bladder and limit its lateral expansion at the location of the roller and thereby prevent contact of the bladder with the roller.

Figure 4:
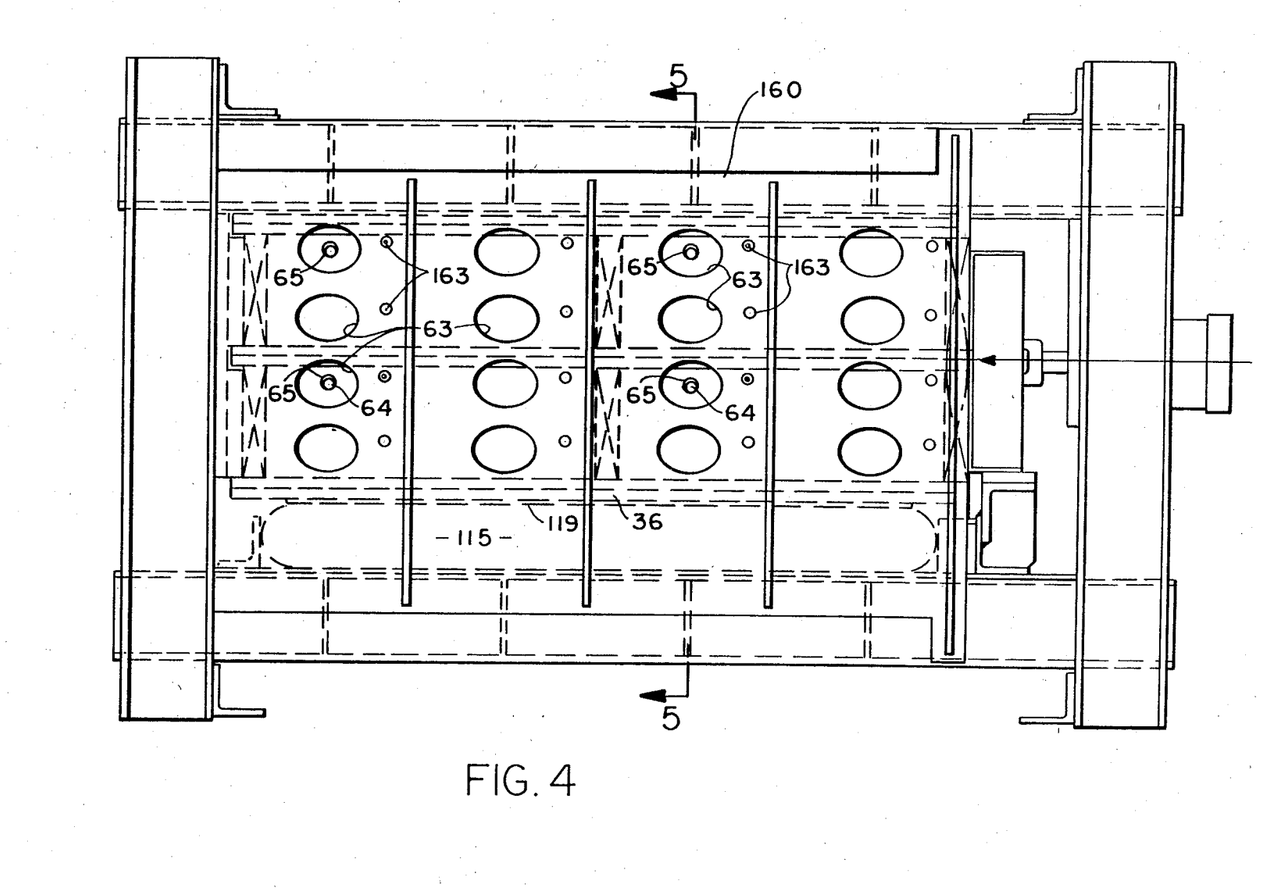
FIG. 4 is an enlarged elevational view taken on line 4—4 of FIG. 1.

The probe 64 for introducing insulating material into the interior of the panels takes the form of an elongated tubular element extending longitudinally along an axis 123 and movable horizontally along that axis through openings 63 and 65 of FIGS. 4 and 5 to the position illustrated in FIG. 5 in which the extremity 124 of probe 64 is received adjacent the end wall 20 of the panel. Upon reaching this position, flow is started at the exterior end of the probe, with the initially liquid foam insulating material flowing longitudinally through the probe and then emitting from its end at that location into the interior of the panel, and rapidly forming into a mass of foam, as at 25. The probe may be actuable manually along axis 123 by a handle 126 attached to an end of the probe, or may be power driven in any appropriate manner to first advance into the panel to the position of FIG. 5 and then be withdrawn gradually as the insulating material is emitted under pressure into the cavity within the panel. A typical powered drive for the probe is illustrated diagrammatically at 127 as including a friction roller 128 engageable with a side of the probe and adapted to be driven in either direction by a reversible motor 129 to either advance the probe into the panel or retract it therefrom. The probe may be guided during this movement by an appropriate guide structure represented diagrammatically at 130. The initially liquid foam material is delivered to the inlet end of the probe from a pressurized source represented at 131, through a flexible line 132 and under the control of a manually actuated inlet valve 133. A probe of the type discussed can be provided in each of the openings 65 of FIG. 4, or in only certain ones of the openings, or at only one opening in which case the single probe may be manually inserted sequentially into different openings for filling different panels.

To now describe a cycle of operation of the apparatus, assume that the probe or probes 64 are initially withdrawn leftwardly to retracted positions in which they do not project into the interior of the press or its inner chamber 37, and assume that door 28 has been actuated by hoist 86 to the broken line open position of FIG. 1, and that two superimposed panels 11 and 12 are located on the support board 36 with end filler pieces 61 and 62 in place in the position illustrated in FIG. 1 at the outside of the press. Board 36 and the panels are in this position located on rollers 32 of conveyor 29, and can be pushed leftwardly in FIG. 1 on those rollers to enter chamber 37 in the press and engage the upper sides of rollers 34 along opposite edges of the member 36, to thereby support the member 36 and the panels as they slide on the rollers to the fully inserted position of FIG. 5. After the panels reach that position, and fillers 43, 44, 161 and 162 are in place, hoist 86 may be actuated to allow the door 28 to swing downwardly from its broken line open position of FIG. 1 to its full line closed position of that figure, with the plate 79 being free for limited shifting movement relative to the main member 77 of the door by virtue of the loose connection provided between the parts by bolts 83 (FIG. 7), to thus allow the plate 79 to adjust its position slightly for assuring proper engagement with and application of force to the fillers 161 and 162 at the ends of the panels. When the door has reached its closed condition, it is locked in that condition by insertion of latching pins 108 and 108a into their latching positions of FIGS. 8 and 9 with respect to the door carried elements and coacting latching structures. With the door latched in its closed condition, air is supplied to bladder 115 to inflate it in a manner actuating plate 119 upwardly against board 36, and thereby raising board 36 and the panels supported thereon off of rollers 34 to press the upper panel against the top wall 38 of chamber 37. The bladder is inflated sufficiently to apply substantial compressive force to the upper and lower sides of the panels, confining the panels effectively between the bladder and top wall surface 39 to prevent downward deformation of the bottom wall of the lower panel 12 and upward deformation of the top wall of upper panel 11. The piston and cylinder mechanisms 78 carried by the door may then be actuated pneumatically to press plate 79 inwardly against fillers 161 and 162 and the end boards 20 of the panels, with that force being transmitted through studs 15, 16 and 17 of the panels to the opposite end elements 21, to press those members against filler blocks 61 and 62 bearing against end wall 160. Thus force is applied inwardly against members 20 and 21 to confine them against displacement longitudinally of the panels by the pressure of insulating material injected into the panels. Similarly, the piston and cylinder mechanisms 46 at a side of the press are actuated to move pressure plate 51 inwardly against studs 17 of the panels, with that force being transmitted through sill 20 and plate 21 of the panels to studs 15 at the opposite sides of the panels, causing them to bear against filler blocks 43 contacting side wall 41. In this way, inward force is applied to studs 17 at one side of the panel and to studs 15 at the opposite side of the panel.

With the panels being restrained in this manner against vertical deformation and against horizontal deformation either longitudinally or transversely of the panels, probe 64 may be advanced into the interior of one of the panels, rightwardly as viewed in FIG. 5, to the position represented in full lines in that figure, with valve 133 being opened in that FIG. 5 position to commence flow of liquid foam from the probe into an end portion of the cavity within that panel. As the foam material discharges into the panel, the probe 64 is progressively withdrawn leftwardly, to progressively fill one of the cavities in the panel, say between studs 15 and 16, from the right end of the cavity to its left end, with ultimate removal of the probe completely from the interior of the panel. A plug may then be connected into the opening 65 in the wall 21 of the panel through which the filling was effected, to seal the insulating material within the cavity. This process may be repeated by inserting the probe 64 into the second cavity of the panel (between studs 16 and 17) through a second of the openings 65 at the end of the press, initially discharging the foam into the right end of that cavity as discussed and then gradually moving the probe leftwardly to fill the panel from right to left and ultimately plug or otherwise close the filled opening. The two cavities in the other panel can then be filled in the same way. If powered actuating equipment for moving a probe or probes is provided as represented at 127 in FIG. 5, that mechanism is energized to first insert each probe and then withdraw it while emitting insulating material as discussed. Four such power actuated probes may function simultaneously, or sequentially.

After both panels have been filled, they are left in the press for a predetermined period of time sufficient to allow hardening of the foam material to an essentially rigid porous condition. The piston and cylinder mechanisms 46 and 78 may then be released to remove the compressive forces from the sides and ends of the panels, and bladder 115 may be deflated to collapse downwardly to the FIG. 2 condition, with door 28 then being opened by hoist 86 to allow the insulated panels and their supporting member 36 to be rolled outwardly along axis 33 and onto conveyor 29 for removal therefrom in preparation for a next successive operation of the press.

Figure 14:
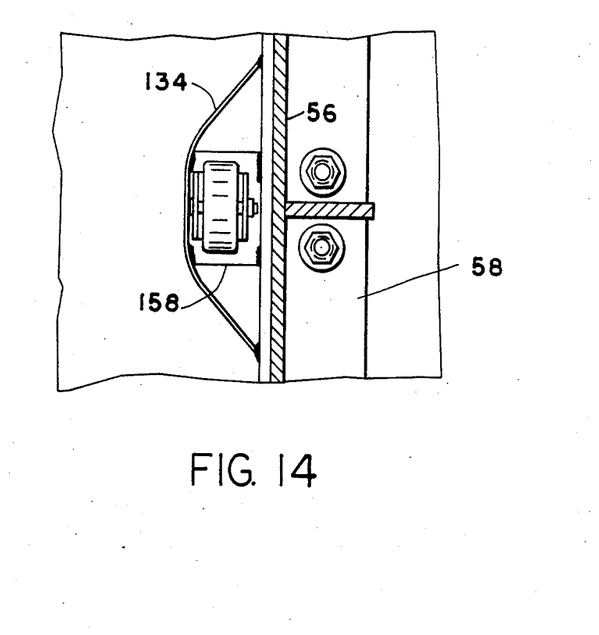
FIG. 14 is an enlarged fragmentary horizontal section taken on line 14—14 of FIG. 13.
Figure 15:
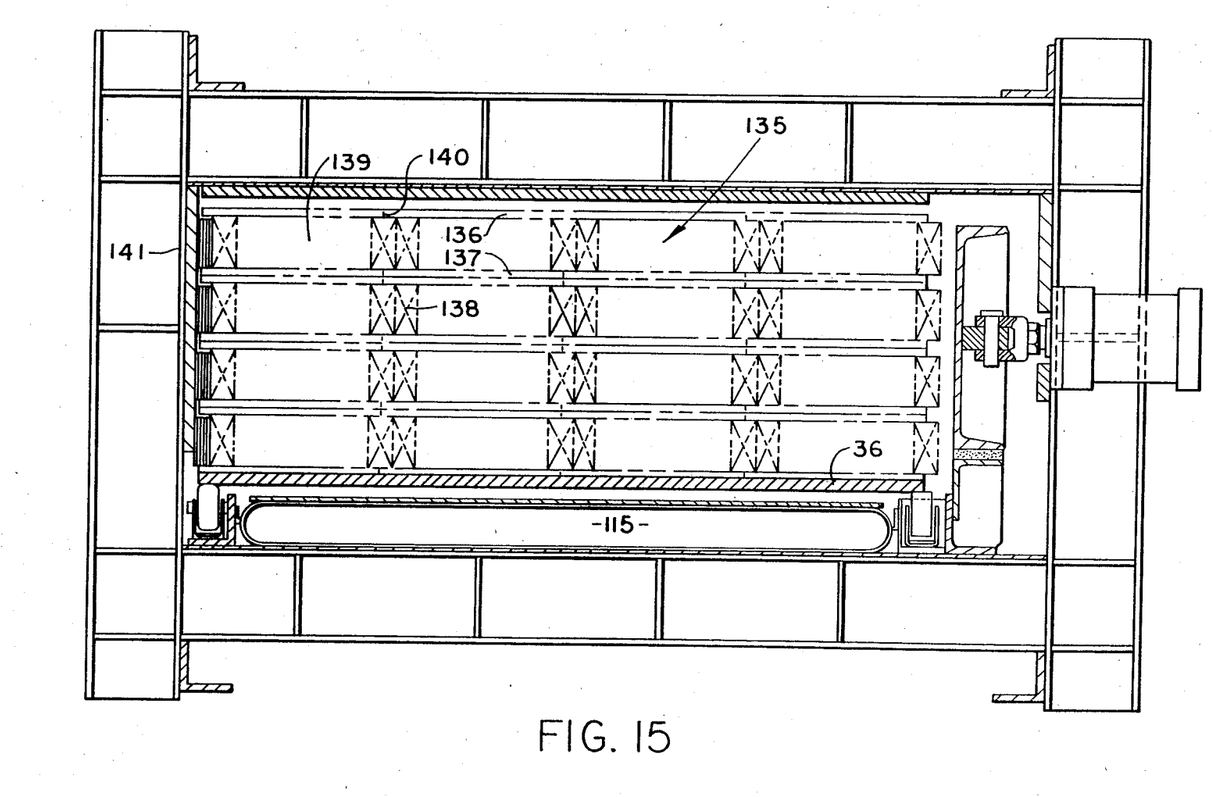
FIG. 15 is a fragmentary vertical sectional view similar to a portion of FIG. 2, but showing the press as used for filling panels which are four inches thick rather than eight inches thick.

FIG. 15 is a view similar to FIG. 2, but representing the manner in which the same press illustrated in FIGS. 1 through 13 can be utilized for insulating panels which are four inches thick rather than eight inches thick. In FIG. 15, sixteen such thinner panels are represented at 135, each having two parallel inner and outer skins 136 and 137 with studs 138 extending therebetween, and with end boards 139 disposed across opposite ends of the panels and corresponding to boards 20 and 21 of FIG. 5. In the same vertical dimension in which the two panels 11 and 12 fit in FIG. 2, there may be positioned four layers of the thinner panels 135 of FIG. 15. Also, these panels 135 are typically illustrated as having a narrower width, with four such panels being provided at each level and meeting at 140. The panels are stacked in this manner on the base member 36, and may then be rolled into the press in the same way discussed in connection with panels 11 and 12, to be confined and restrained vertically by inflation of bladder 115, and to be confined horizontally by actuation of the side and end piston and cylinder mechanisms 46 and 78. In lieu of the filler blocks 43, 44, 61, 62, 161 and 162 of FIGS. 2 and 5, the FIG. 15 arrangement contemplates provision of similar filler blocks 141 having the same horizontal dimensions as blocks 43, 44, 61, 62, 161 and 162 but having reduced vertical dimensions to fit between the more closely, spaced upper and lower skins 136 and 137 of the FIG. 14 panels, and thereby bear inwardly against the studs and members 139 of the panels. These filler blocks 141 are provided at the sides and also the ends of the panels to serve the same function as the corresponding filler blocks of the first form of the invention. In the FIG. 14 arrangement, the probe or probes 64 must be inserted into the panels at more locations than in the previously discussed arrangement, in order to allow filling of the spaces within all of the sixteen panels. More particularly, a probe or a number of probes are in this instance inserted through all of the sixteen openings 65 illustrated in FIG. 4, which openings are located for extension into the sixteen panels respectively of FIG. 14. As in the previously discussed arrangement, the insulating material is allowed to harden while the restraining forces are still applied to the panels, after which the restraining forces are released, the door is opened, and the panels are moved outwardly onto the external conveyor.

Panels of other thickness and horizontal widths can be filled in essentially the same manner discussed in connection with the eight inch panels of FIGS. 1 to 13 and the four inch panels of FIG. 14. For example, a single panel sixteen inches thick can be inserted into the press and be engaged directly at its upper lower sides by top wall 38 and the bladder actuated bottom plate 119 and at its opposite sides and end by the discussed side and end restraining elements. Further, any size panel may contain door or window openings, electrical conduits, plumbing pipes or the like, as may be desirable in the particular building structure in which the panel is to be used.

While certain specific embodiments of the present invention have been disclosed as typical, the invention is of course not limited to these particular forms, but rather is applicable broadly to all such variations as fall within the scope of the appended claims.

I claim:

1. The method that comprises:
   positioning within a chamber in a press at least one hollow building panel having walls extending about a cavity or cavities in the panel;
   inflating a flexible bladder at the outside of said panel and at the outer side of one of said walls;
   filling a foamable insulating material into said cavity or cavities in the panel at the inner side of said one wall; and
   restraining said one wall of the panel, by force exerted by said bladder, against deflection of said one wall outwardly by said foamable insulating material.

2. The method as recited in claim 1, in which said panel is positioned within said chamber above said bladder, and the bladder when inflated applies upward force to the panel.

3. The method as recited in claim 1, including positioning said panel between said bladder and a wall of said chamber to confine the panel therebetween and apply restraining force in opposite directions to the panel by the bladder and said chamber wall upon inflation of the bladder.

4. The method as recited in claim 1, in which a plurality of said panels are positioned in said chamber one above the other, and force is applied to said plurality of panels simultaneously by said bladder.

5. The method as recited in claim 1, including moving said panel from a first position to a second position in said chamber by force exerted by said bladder upon inflation thereof.

6. The method as recited in claim 1, in which said bladder is positioned for reception beneath said panel when the panel is within said chamber, said method including raising the panel in said chamber by force exerted upwardly by said bladder upon inflation thereof.

7. The method as recited in claim 1, including moving said panel generally horizontally into said chamber, supporting said panel on a support structure as the panel is moved into the chamber, and then moving the panel by force exerted by inflation of said bladder away from its position of support by said support structure.

8. The method as recited in claim 1, including moving said panel generally horizontally into said chamber and to a position above said inflatable bladder, supporting said panel on rollers as it is moved into the chamber, and thereafter raising the panel by force exerted by the bladder when inflated to a position in which the panel is no longer supported by said rollers.

9. The method as recited in claim 1, including applying force to additional walls of said panel extending along opposite edges thereof to restrain said additional walls upon filling of said foamable insulating material into said cavity or cavities.

10. The method as recited in claim 1, in which said insulating material is filled into said cavity or cavities by inserting an elongated element longitudinally into the panel and filling the insulating material into the cavity or cavities through said elongated element.

11. The method that comprises:

moving generally horizontally into an open end of a chamber in a press at least one hollow building panel having parallel top and bottom walls and having edge walls extending between said top and bottom walls along opposite sides and opposite ends of the panel to define a cavity or cavities in the panel;

inflating a flexible bladder within the press at the outside of said panel and beneath said bottom wall thereof;

applying upward force to said panel by inflation of said bladder and thereby pressing the panel upwardly against resistance offered by a top wall of said chamber;

applying force inwardly against said edge walls of the panel at said opposite sides and opposite ends of the panel;

filling a foamable insulating material into said cavity or cavities in the panel and between said top and bottom walls of the panel;

restraining said top and bottom walls of the panel against deflection by said insulating material by confinement of the panel between said bladder and said top wall of the chamber; and restraining said edge walls against displacement by the foamable insulating material by said force exerted inwardly thereagainst.

12. The method as recited in claim 11, including supporting said panel movably on a support structure during advancement of the panel into said chamber, and thereafter raising the panel by force exerted by said inflated bladder and to a position in which the panel is no longer supported by said support structure.

13. The method as recited in claim 12, in which said foamable insulating material is filled into said panel by advancing an elongated element longitudinally into the panel, discharging the foamable insulating material into the panel through said elongated element, and progressively withdrawing said elongated element from the panel during delivery of the foamable insulating material through the elongated element into the panel.

14. The method as recited in claim 13, including applying said force to said edge walls of the panel at locations between said top and bottom walls of the panel and without applying force to the edges of said top and bottom walls of the panel.

15. The method as recited in claim 1, in which said panel has a second wall extending essentially parallel to said one wall and which is restrained against deflection by said chamber, said panel having edge walls extending between said one wall and said second wall about the periphery of the panel, said method including applying restraining force inwardly against said edge walls at locations between said one wall and said second wall and without applying force directly to adjacent edges of said one wall and said second wall.

16. The method that comprises:

positioning within a chamber in a press a plurality of hollow building panels each having top and bottom walls and a cavity or cavities therebetween, and with said panels stacked one upon the other and with the bottom wall of one panel supported by the top wall of the next lower panel;

confining said plurality of panels vertically between an upper structure above the top panel and a lower structure beneath the bottom panel;

filling a foamable insulating material into said cavity or cavities in all of said panels while thus confined; and restraining said top and bottom walls of each of the panels by confinement between said upper and lower structures against deflection of said top and bottom walls of the panels by said foamable insulating material.

17. The method as recited in claim 16, in which said lower structure includes an inflatable bladder beneath the bottom wall of said bottom panel, said method including inflating said bladder and applying upward force to said bottom wall of the bottom panel and to said plurality of panels by such inflation of the bladder.

18. The method as recited in claim 16, in which one of said structures includes an inflatable bladder at the outside of said panels, said method including inflating said bladder and applying force to said plurality of stacked panels by such inflation of the bladder.

19. The method that comprises:

positioning within a chamber in a press a plurality of hollow building panels each having spaced walls and a cavity or cavities therebetween;

confining said plurality of panels between a first structure and a second structure;

filling a foamable insulating material into said cavity or cavities in all of said panels while thus confined; and restraining said spaced walls of each of the panels, by confinement between said two structures, against deflection of said walls of the panels by said foamable insulating material.

20. The method as recited in claim 19, in which one of said structures includes an inflatable bladder at the outside of said panels, said method including inflating said bladder and applying force to said plurality of panels by such inflation of the bladder.

21. Apparatus comprising:

a structure containing a chamber adapted to receive at least one hollow building panel having walls extending about a cavity or cavities in the panel;

means for filling a foamable insulating material into said cavity or cavities in the panel and at an inner side of one of said walls of the panel while the panel is located in said chamber; and an inflatable bladder positioned to be received at the outside of said panel and at the outer side of said one wall when the panel is in said chamber, and which acts when inflated to apply force to said one wall restraining it against deflection outwardly by the foamable insulating material filled into the panel.

22. Apparatus as recited in claim 21, in which said inflatable bladder is positioned for reception beneath a panel when the panel is located in said chamber, and acts to apply force upwardly to the panel.

23. Apparatus as recited in claim 21, in which said chamber has a restraining wall at a side of said panel opposite that at which said bladder is located and to which to force of said bladder is applied through the panel.

24. Apparatus as recited in claim 21, in which said chamber has an upper wall received above said panel when the panel is in the chamber, said bladder being located at the underside of the panel and acting upon inflation to press the panel upwardly against resistance offered by said upper wall.

25. Apparatus as recited in claim 21, in which said bladder is located beneath the panel when the panel is in said chamber and is operable to displace the panel upwardly in the chamber upon inflation of the bladder.

26. Apparatus as recited in claim 21, including a support structure acting to support said panel during movement of the panel generally horizontally into said chamber, said bladder being located beneath the panel and operable upon inflation to displace the panel upwardly relative to said support structure and to a position in which the panel is no longer supported thereby.

27. Apparatus as recited in claim 21, in which said bladder is operable upon inflation to move said panel from a first position to a second position within said chamber.

28. Apparatus as recited in claim 21, including rollers supporting said panel movably for advancement generally horizontally into said chamber and to a location above said bladder, said bladder being operable upon inflation to displace the panel upwardly to a position in which it is no longer supported by said rollers.

29. Apparatus as recited in claim 21, including means for applying restraining force to edges of said panel at different sides thereof.

30. Apparatus as recited in claim 21, including fluid pressure actuated means for applying force to first edges of said panel and thereby pressing opposite edges of the panel toward a wall of said chamber.

31. Apparatus as recited in claim 21, in which said panel has a second wall extending essentially parallel to said one wall at an opposite side of the panel, and said panel has edge walls extending between said one wall and said second wall at opposite ends of the panel and at opposite sides of the panel, said apparatus including fluid actuated piston and cylinder means at a first end of said chamber applying force against one of said edge walls at that end acting to press an opposite end wall of the panel against an end of said chamber, and additional piston and cylinder means at a side of the panel applying force against an edge wall of the panel at that side in a relation pressing an edge wall at the opposite side of the panel against a side of said chamber.

32. Apparatus as recited in claim 21, in which said means for filling foamable insulating material into said cavity or cavities includes an elongated element insertible longitudinally into an edge of said chamber and through which the foamable insulating material is injected into the cavity or cavities.

33. Apparatus comprising:

a structure containing a chamber adapted to receive at least one hollow building panel having parallel top and bottom walls and having edge walls extending between said top and bottom walls at opposite side and opposite ends of the panel;

said structure containing a chamber having a top wall, two opposite side walls, an end wall at a first end of the chamber, and a door at an opposite end of the chamber openable to permit generally horizontal movement of the panel through the door and into said chamber;

an inflatable bladder extending across the bottom of said chamber and adapted to be received beneath said panel and beneath said bottom wall thereof and operable upon inflation to press the panel toward said top wall of the chamber;

piston and cylinder means carried by one of said side walls of the chamber and acting to apply force inwardly against one of said edge walls of the panel to press another edge wall of the panel at an opposite side of the panel against the second side wall of the chamber;

additional piston and cylinder means carried by said door and operable to exert force against an edge wall of the panel at that end of the chamber in a relation pressing another edge wall of the panel at the opposite end of the chamber against said end wall of the chamber; and means for injecting a foamable insulating material into said cavity or cavities in the panel and between said top and bottom walls of the panel while the panel is restrained against distortion by confinement vertically between said bladder and said top wall of the chamber and by confinement laterally between said first mentioned piston and cylinder means and an opposite side wall of the chamber, and by confinement between said additional piston and cylinder means and said end wall of the chamber.

34. Apparatus as recited in claim 33, including rollers for supporting said panel movably during advancement thereof generally horizontally into said chamber, said inflatable bladder being constructed upon inflation to raise said panel upwardly to a position in which it is no longer supported by said rollers and is pressed upwardly against resistance offered by said top wall of said chamber.

35. Apparatus as recited in claim 34, in which said means for injecting said foamable insulating material into said cavity or cavities include an elongated element insertible longitudinally into said chamber through one of said edge walls thereof and through which the foamable insulating material is injected into the panel.

* * * * *